UNITED STATES PATENT OFFICE.

WORTH H. RODEBUSH, OF BALTIMORE, MARYLAND, ASSIGNOR TO U. S. INDUSTRIAL ALCOHOL CO., A CORPORATION OF WEST VIRGINIA.

METHOD OF MAKING GLYCOL.

1,402,317. Specification of Letters Patent. Patented Jan. 3, 1922.

No Drawing. Application filed August 25, 1919. Serial No. 319,730.

*To all whom it may concern:*

Be it known that I, WORTH H. RODEBUSH, a citizen of the United States, residing at Baltimore, State of Maryland, have invented a certain new and useful Improvement in Methods of Making Glycol, of which the following is a specification.

My invention relates particularly to a process of making glycol and refers especially to the production of glycol from halogenated hydrocarbons.

The object of my invention is to provide an advantageous process for producing glycol from halogenated hydrocarbons and which may be operated substantially as a one stage process if desired.

Another object of my invention is to provide a process by means of which a catalyst is used that will form glycol direct from a halogenated hydrocarbon, as for example ethylene dichloride, in the presence of an inorganic salt and an alcohol.

Further objects of my invention will appear from the detailed description thereof contained hereinafter.

While my invention is capable of being carried out in many different ways for the purpose of illustration I shall describe only certain ways of carrying out the same hereinafter.

For example in carrying out my invention I may proceed as follows:

As one example of my invention I mix together—

10 parts by weight of ethylene dichloride.
10 parts by weight of sodium carbonate.
2 parts by weight of sodium acetate.
15 parts by weight of alcohol.

Some water should be present in the above mixture. This could be taken care of by using alcohol having a strength of 85%.

The materials which have been mixed together are preferably heated in a still having a reflux condenser to a temperature of 125° to 175° C. for several hours at a pressure of 150 to 200 pounds per square inch and during the reaction the carbon dioxide produced is discharged so as to avoid excessive pressures. The reflux condenser prevents the escape of the alcohol and ethylene dichloride. During the reaction sodium chloride is formed and after the completion of the reaction the solid sodium chloride is separated from the liquid which consists of a solution of glycol in alcohol. The glycol and alcohol are separated by fractional distillation and the crude glycol thus obtained is refined by distillation.

While the process is being carried out it is probable an acetic acid ester is formed which is hydrolyzed by the sodium carbonate to form the carbon dioxide, sodium acetate and glycol. The sodium acetate thus formed reacts with more dichloride. This cycle is repeated until all the dichloride is changed to glycol.

Instead of the ethylene dichloride it will be understood that I may use ethylene dibromide or ethylene diiodide or other chlorinated hydrocarbons. Instead of the catalyst sodium acetate I may use potassium acetate or sodium or potassium formate or practically any other organic salt of an alkali metal which is soluble in alcohol. I may use instead of alkali salt of an organic acid, alcohol esters of an organic acid. Instead of the ethyl alcohol I may use some other alcohol, as for example methyl alcohol, and in place of sodium carbonate I may use any other suitable carbonate.

While I have described my invention above in detail, I wish it to be understood that many changes may be made therein without departing from the spirit of my invention.

I claim:

1. The process of making a glycol comprising allowing an olefine dihalide to interact with a carbonate, an alcohol, and an alcohol soluble salt of an organic acid.

2. The process of making a glycol comprising allowing ethylene dihalide to interact with an alkali metal carbonate, alcohol, and an alcohol soluble alkali metal salt of acetic acid.

3. The process of making a glycol comprising allowing an olefine dihalide to interact with a carbonate, an alcohol, and an alcohol soluble salt of an organic acid, with the application of heat under pressure.

4. The process of making a glycol comprising allowing an olefine dihalide to interact with a carbonate, an alcohol, and an alcohol soluble salt of an organic acid, with the application of heat under pressure in the presence of water.

5. The process of making a glycol comprising allowing an olefine dihalide to interact with a carbonate, an aqueous alcohol, and an alcohol soluble salt of an organic acid.

6. The process of making a glycol comprising allowing ethylene dichloride to interact with a carbonate, ethyl alcohol, and an alkali metal acetate, with the application of heat under pressure in the presence of water.

7. The process of making a glycol comprising allowing about 10 parts ethylene dichloride to interact with about 10 parts sodium carbonate, about 2 parts sodium acetate and about 15 parts ethyl alcohol at a temperature of about 150° C. and a pressure of about 175 lbs. per sq. in. in the presence of water.

8. The process which comprises making glycol by subjecting ethylene dichloride, an alcohol and a carbonate of an alkali metal to an organic salt of an alkali metal.

9. The process which comprises making glycol by subjecting ethylene dichloride, an alcohol and a carbonate of an alkali metal to an organic salt of an alkali metal with the application of heat under pressure.

10. The process which comprises making glycol by subjecting ethylene dichloride, an alcohol and a carbonate of an alkali metal to an organic salt of an alkali metal with the application of heat under pressure while allowing carbon dioxide to escape but condensing the vaporized liquid.

11. The process which comprises making glycol by subjecting ethylene dichloride, an alcohol and a carbonate of an alkali metal to sodium acetate with the application of heat under pressure.

12. The process which comprises making glycol by subjecting ethylene dichloride, an alcohol and a carbonate of an alkali metal to sodium acetate with the application of heat under pressure while allowing carbon dioxide to escape but condensing the vaporized liquid.

In testimony that I claim the foregoing, I have hereunto set my hand this 31 day July, 1919.

WORTH H. RODEBUSH.